(12) United States Patent
McDaniel

(10) Patent No.: US 11,432,664 B2
(45) Date of Patent: Sep. 6, 2022

(54) SAFETY HANGER

(71) Applicant: Uttermost Co., Rocky Mount, VA (US)

(72) Inventor: Joseph McDaniel, Ferrum, VA (US)

(73) Assignee: UTTERMOST CO., Rocky Mount, VA (US)

( * ) Notice: Subject to any disclaimer, the term of this patent is extended or adjusted under 35 U.S.C. 154(b) by 0 days.

(21) Appl. No.: 17/019,923

(22) Filed: Sep. 14, 2020

(65) Prior Publication Data

US 2022/0079356 A1    Mar. 17, 2022

(51) Int. Cl.
| | | |
|---|---|---|
| *A47G 1/20* | (2006.01) | |
| *A47G 1/16* | (2006.01) | |
| *F16B 45/00* | (2006.01) | |
| *F16B 45/02* | (2006.01) | |

(52) U.S. Cl.
CPC .............. *A47G 1/20* (2013.01); *A47G 1/162* (2013.01); *F16B 45/015* (2021.05); *F16B 45/036* (2021.05); *A47G 2001/207* (2013.01); *F16B 45/00* (2013.01); *F16B 45/02* (2013.01)

(58) Field of Classification Search
CPC ...... A47G 2001/207; A47G 1/20; A47G 1/22; A47G 1/162; F16B 45/02; F16B 45/00; E04D 13/072; E04D 13/0722; E04D 13/0725; E04D 13/0727; B41K 1/58; G09F 17/00
USPC ......................................................... D8/373
See application file for complete search history.

(56) References Cited

U.S. PATENT DOCUMENTS

| | | | | |
|---|---|---|---|---|
| 240,110 A | * | 4/1881 | English | F16B 45/02 24/601.4 |
| 339,976 A | * | 4/1886 | Dietz | B62D 33/0207 280/143 |
| 437,991 A | * | 10/1890 | Hubbard | F16B 45/02 24/599.4 |
| 547,877 A | * | 10/1895 | Covert | F16B 45/02 24/582.11 |
| 797,941 A | * | 8/1905 | Corbett | F16B 45/02 24/599.4 |
| 875,714 A | * | 1/1908 | Leighton | F16B 45/02 24/601.4 |
| 992,203 A | * | 5/1911 | Johnson | A47G 1/22 248/301 |
| 1,059,812 A | * | 4/1913 | Barry | F16B 45/02 24/601.1 |
| 1,120,385 A | * | 12/1914 | Hunt | A47G 25/06 248/301 |

(Continued)

FOREIGN PATENT DOCUMENTS

| | | | | |
|---|---|---|---|---|
| CA | 2305159 A1 | * | 10/2001 | ........... E04D 13/076 |
| DE | 379897 C | * | 8/1923 | ............. A47G 1/162 |

(Continued)

*Primary Examiner* — Jonathan Liu
*Assistant Examiner* — Taylor L Morris
(74) *Attorney, Agent, or Firm* — Coats & Bennett, PLLC

(57) ABSTRACT

A hanger to hang an object to a support. The hanger includes an elongated base with a back, a mount that overlaps with a top section of the back, and a hook that overlaps with a bottom section of the back. A tongue is mounted to the back and extends outward from the back towards the hook. Apertures extend through the back, the tongue, and the mount, with the apertures aligned in a straight line. The base comprises a unitary, one-piece construction.

16 Claims, 5 Drawing Sheets

(56) References Cited

U.S. PATENT DOCUMENTS

| | | | | |
|---|---|---|---|---|
| 1,276,474 A * | 8/1918 | Andes | F16B 45/02 | 24/582.11 |
| 1,434,052 A * | 10/1922 | English | B60C 27/06 | 24/599.3 |
| 1,519,442 A * | 12/1924 | Deeter | F16B 45/02 | 24/599.9 |
| 1,523,042 A * | 1/1925 | Alva | E04H 12/32 | 248/537 |
| 1,665,059 A * | 4/1928 | Hill | F16B 45/02 | 24/600.9 |
| 1,677,379 A * | 7/1928 | Annin | E04H 12/32 | 248/538 |
| 1,908,200 A * | 5/1933 | Chilion | A47G 1/1686 | 248/495 |
| 1,924,864 A * | 8/1933 | Kochler | A47G 1/162 | 248/489 |
| 2,105,061 A * | 1/1938 | Tate | A47G 1/20 | 248/249 |
| 2,105,062 A * | 1/1938 | Tate | A47G 1/20 | 206/231 |
| 2,187,441 A * | 1/1940 | Baxter | F16B 45/02 | 24/600.9 |
| 2,224,008 A * | 12/1940 | Auslander | A47G 1/20 | 248/489 |
| 2,226,168 A * | 12/1940 | Kass | A47G 1/1653 | 248/547 |
| 2,331,816 A * | 10/1943 | Tollefson | F16B 45/02 | 24/599.2 |
| 2,334,700 A * | 11/1943 | Frey | A47G 1/20 | 248/493 |
| 2,452,694 A * | 11/1948 | Aurelius | A47G 1/1633 | 248/493 |
| 2,454,813 A * | 11/1948 | Larson | A47G 1/20 | 248/493 |
| 2,497,615 A * | 2/1950 | Lux | A47G 1/20 | 248/493 |
| 2,539,825 A | 1/1951 | Genua | | |
| 2,546,280 A * | 3/1951 | Stein | A01K 97/10 | 248/534 |
| 2,657,446 A * | 11/1953 | Roberts | F16B 45/02 | 294/82.21 |
| 2,709,055 A * | 5/1955 | Harty | A47G 1/1606 | 248/498 |
| 2,723,815 A * | 11/1955 | Browning | A47G 1/20 | 248/547 |
| 2,940,712 A * | 6/1960 | Lloyd-Young | A47G 1/20 | 248/489 |
| 3,040,404 A * | 6/1962 | Boger, Sr. | F16B 45/02 | 24/599.5 |
| 3,051,427 A * | 8/1962 | Alvarez | A47G 1/1686 | 248/224.8 |
| 3,056,570 A * | 10/1962 | Slavin | H01Q 1/3258 | 248/539 |
| 3,063,669 A * | 11/1962 | Bell | A47G 1/20 | 248/549 |
| 3,146,981 A * | 9/1964 | Wheeler | A47G 1/20 | 248/498 |
| 3,333,803 A * | 8/1967 | Landis | E04D 13/072 | 248/48.2 |
| 3,620,562 A * | 11/1971 | Masataro | F16B 45/02 | 294/82.18 |
| 3,861,631 A | 1/1975 | Shorin | | |
| 3,982,719 A * | 9/1976 | Kilborne | A47G 1/20 | 248/489 |
| 4,073,042 A * | 2/1978 | Miller | F16B 45/02 | 24/599.2 |
| 4,523,357 A | 6/1985 | Widditsch | | |
| D279,473 S * | 7/1985 | Hochstetler | D14/238 | |
| 4,546,523 A * | 10/1985 | Bailey, Jr. | F16B 45/02 | 24/599.7 |
| 4,564,182 A * | 1/1986 | Svajgl | E04D 13/0722 | 269/102 |
| 4,610,419 A * | 9/1986 | Swanson | A47G 1/20 | 248/493 |
| 4,619,430 A * | 10/1986 | Hogg | A47F 5/0823 | 248/216.1 |
| 4,708,552 A * | 11/1987 | Bustos | F16B 13/126 | 248/231.91 |
| 4,757,649 A * | 7/1988 | Vahldieck | E04D 13/064 | 52/11 |
| D299,003 S * | 12/1988 | Fadeley, Jr. | D8/367 | |
| 4,795,294 A * | 1/1989 | Takada | A47G 1/22 | 411/457 |
| 4,821,992 A | 4/1989 | Johnson | | |
| 4,976,410 A * | 12/1990 | Tomaiuolo | B60R 13/005 | 116/173 |
| D315,669 S | 3/1991 | Paul | | |
| D322,927 S * | 1/1992 | Schuster | D8/367 | |
| 5,267,719 A * | 12/1993 | Keller | A47G 1/20 | 248/475.1 |
| D346,952 S * | 5/1994 | Keller | D8/373 | |
| 5,388,377 A * | 2/1995 | Faulkner | E04D 13/0725 | 52/11 |
| 5,437,429 A * | 8/1995 | Atlas | A47G 1/20 | 248/493 |
| 5,482,244 A * | 1/1996 | Hickey | A47G 1/20 | 248/489 |
| 5,507,462 A * | 4/1996 | Hickey | A47G 1/20 | 248/301 |
| 5,634,246 A * | 6/1997 | Jermyn, Jr. | F16B 45/02 | 24/265 H |
| 5,639,049 A | 6/1997 | Jennings et al. | | |
| 5,685,516 A * | 11/1997 | Simmons | A47G 1/20 | 248/489 |
| 5,761,776 A * | 6/1998 | Vollebregt | F16B 45/02 | 24/706.1 |
| 5,878,988 A | 3/1999 | Rakower | | |
| 6,126,372 A * | 10/2000 | Takata | F16B 15/0015 | 411/463 |
| 6,338,463 B1 * | 1/2002 | Babitz | A45C 13/18 | 248/306 |
| 6,427,296 B1 * | 8/2002 | Chang | B66C 1/36 | 24/371 |
| 6,601,274 B2 * | 8/2003 | Gartsbeyn | F16B 45/02 | 24/599.8 |
| 6,631,587 B2 * | 10/2003 | Lynch | E04D 13/0725 | 248/48.1 |
| 6,651,945 B2 * | 11/2003 | Rivellino | A47G 1/17 | 248/206.5 |
| 6,658,796 B1 * | 12/2003 | Higgins | E04D 13/0725 | 248/48.2 |
| D515,404 S * | 2/2006 | Hardina | D8/373 | |
| 6,993,870 B2 * | 2/2006 | McDonald | E04D 13/0481 | 52/11 |
| 7,147,196 B2 * | 12/2006 | Knight | G09F 7/18 | 248/490 |
| 7,222,833 B2 * | 5/2007 | Yang | A47G 1/20 | 248/493 |
| D556,028 S * | 11/2007 | Rodder | D8/373 | |
| D563,210 S * | 3/2008 | Rodder | D8/373 | |
| D571,642 S * | 6/2008 | Rodder | D8/373 | |
| 7,556,235 B1 * | 7/2009 | Farris | A47G 1/162 | 248/468 |
| 7,946,005 B2 * | 5/2011 | Lee | F16B 45/02 | 24/582.11 |
| 8,001,663 B2 * | 8/2011 | Belcourt | F16B 45/02 | 24/599.5 |
| 8,113,476 B2 | 2/2012 | Serio | | |
| 8,297,667 B2 * | 10/2012 | Pauken | B60R 7/043 | 292/169.14 |
| 8,398,048 B2 * | 3/2013 | Popkin | B29C 45/14426 | 248/547 |
| 8,402,616 B2 * | 3/2013 | Petzl | F16B 45/02 | 24/599.6 |
| 9,186,001 B2 * | 11/2015 | Popkin | A47G 1/162 | |
| 9,382,939 B1 | 7/2016 | Rullo | F16B 45/02 | |
| 9,797,432 B2 * | 10/2017 | Inkavesvaanit | F16B 45/02 | |
| 9,994,430 B1 * | 6/2018 | Hooper | B62B 3/04 | |

(56) References Cited

U.S. PATENT DOCUMENTS

| | | | | |
|---|---|---|---|---|
| 10,066,660 B2 * | 9/2018 | Henn | | F16B 45/02 |
| 10,842,299 B2 * | 11/2020 | Dempsey | | A47K 10/04 |
| 2004/0195477 A1 * | 10/2004 | Rivellino | | A47G 1/20 |
| | | | | 248/216.4 |
| 2005/0172461 A1 * | 8/2005 | Hall | | A63B 29/02 |
| | | | | 24/599.9 |
| 2005/0193638 A1 * | 9/2005 | Robinson | | E04D 13/0725 |
| | | | | 52/12 |
| 2007/0214616 A1 * | 9/2007 | Peterson | | F16G 11/143 |
| | | | | 24/599.1 |
| 2008/0174130 A1 * | 7/2008 | Lin | | F16B 45/02 |
| | | | | 294/82.2 |
| 2008/0250615 A1 * | 10/2008 | Emenheiser | | F16B 45/02 |
| | | | | 24/599.5 |
| 2008/0257841 A1 * | 10/2008 | Abernathy | | A47G 1/20 |
| | | | | 211/87.01 |
| 2011/0114806 A1 * | 5/2011 | Losaw | | A47G 29/083 |
| | | | | 248/225.21 |
| 2013/0247339 A1 * | 9/2013 | Wurzer | | F16B 45/06 |
| | | | | 24/600.1 |
| 2014/0196400 A1 * | 7/2014 | Bell | | E04D 13/0725 |
| | | | | 52/705 |
| 2015/0108304 A1 * | 4/2015 | Larsen Roldan | | A47G 1/20 |
| | | | | 248/216.1 |
| 2016/0369833 A1 * | 12/2016 | Lamarque | | F16B 45/02 |
| 2017/0190043 A1 * | 7/2017 | Hintze | | A45F 5/021 |
| 2018/0003214 A1 * | 1/2018 | Canfield | | F16G 11/143 |
| 2018/0038111 A1 * | 2/2018 | Conner | | E04D 13/0725 |
| 2018/0372145 A1 * | 12/2018 | Chaumontet | | F16B 45/02 |
| 2019/0309899 A1 * | 10/2019 | Duarte | | B65G 1/02 |

FOREIGN PATENT DOCUMENTS

| | | | | | |
|---|---|---|---|---|---|
| FR | 2076306 | A5 * | 10/1971 | | E04D 13/0722 |
| FR | 2114074 | A5 * | 6/1972 | | E04D 13/0722 |
| FR | 2516576 | A1 * | 5/1983 | | E04D 13/0722 |
| FR | 2720614 | A1 * | 12/1995 | | A47G 1/20 |

* cited by examiner

SAFETY HANGER

BACKGROUND

Hangers are used to hang a variety of different objects to a vertical support. The objects can include a wide variety of different items, including but not limited to a framed item (e.g., picture, painting, diploma), and a mirror. These items can include a wire or eyelet on a back side and that are configured to engage with the hanger. The hangers can be used to hang the object on a variety of different vertical supports, including but not limited to a wall, door, and column.

The hangers generally include a body shaped to correspond to seat against the vertical support. The body further includes a hook configured to receive the wire or eyelet on the back of the object. The body can also include one or more apertures to receive a hanger to attach the hanger to the vertical support.

In some circumstances, the wire or eyelet can move out of the hook. This can occur while hanging the object and the user is moving the object. This can also occur when the object is being moved while supported on the vertical support, such as during cleaning or inadvertent contact. To prevent the wire or eyelet from moving out of the hook, the hanger can include an extension over the hook. This reduces the size of the hook opening and reduces the likelihood that the when a user if moving the object to adjust its position on the vertical support. A drawback of the extension is it may interfere with the placement of the fastener that hangs the hanger on the vertical support.

SUMMARY

One aspect is directed to a hanger to hang an object to a support. The hanger comprises an elongated base comprising a back, a mount that overlaps with a top section of the back, and a hook that overlaps with a bottom section of the back. A tongue is mounted to the back and extends outward from the back towards the hook. Apertures extend through the back, the tongue, and the mount, and are aligned in a straight line. The base comprises a unitary, one-piece construction.

In another aspect, the base further comprises a first bend between the mount and back and a second bend between the back and the hook.

In another aspect, the back comprises a flat back surface that faces away from the mount and the hook.

In another aspect, the apertures comprise an elongated shape with a major axis that is parallel with a centerline of the base.

In another aspect, each of the back, the tongue, and the mount comprises two sets of aligned apertures with a first one of the sets positioned on a first side of a centerline of the base and a second one of the sets positioned on an opposing second side of the centerline of the base.

In another aspect, the tongue comprises a first section that is mounted to the back and a second section that extends outward from the first section towards the hook.

In another aspect, the one or more apertures in the tongue are positioned at an intersection of the first and second sections of the tongue.

In another aspect, fasteners connect the tongue to the back.

In another aspect, the hook comprises a greater length than the mount with the length measured along a centerline of the base.

In another aspect, the tongue comprises an upper edge and a lower edge with the upper edge positioned in the overlap between the mount and the back and the lower edge positioned in the overlap between the hood and the back.

One aspect is directed to a hanger to hang an object to a support. The hanger comprises a base comprising: a back with a front surface and a back surface with the back surface flat to contact against the support; a hook that extends from the back and is positioned in front of the front surface at a lower section of the back; and a mount that extends from the back and is positioned in front of the front surface of an upper section of the back. A tongue is mounted to the front surface of the back and extends outward from the front surface towards the hook. Apertures extend through the back, the tongue, and the fastener with the apertures aligned in a straight line.

In another aspect, the tongue comprises an upper edge and a lower edge with the upper edge positioned in the overlap between the mount and the back and the lower edge positioned in the overlap between the hook and the back.

In another aspect, the tongue overlaps with both the hook and the mount.

In another aspect, the tongue comprises an angular shape with a first planar section mounted to the front surface of the back and a second planar section that extends outward from the front surface towards the hook.

In another aspect, the one or more apertures in the tongue are positioned at an intersection of the first and second sections.

In another aspect, each of the back, the tongue, and the mount comprises two sets of apertures with a first one of the sets positioned on a first side of a centerline of the base and a second one of the sets positioned on an opposing second side of the centerline of the base.

In another aspect, the apertures comprise an elongated shape that is parallel with the centerline of the base.

One aspect is directed to a hanger to hang an object to a support. The hanger comprises a base comprising a back configured to contact against the support, a hook that overlaps with a bottom section of the back, and a mount that overlaps with a top section of the back. A tongue comprises a first section mounted to the back, a second section that extends outward towards the hook, and a bend positioned at the intersection of the first and second sections with the bend configured for the first and second sections to be aligned at an obtuse angle. Apertures extend through the back, the tongue, and the fastener, with the apertures aligned in a straight line and with the one or more apertures in the tongue positioned at the bend and extending into each of the first and second sections.

In another aspect, the back comprises a flat back surface that faces away from the hook and the mount.

In another aspect, each of the back, the tongue, and the mount comprises two sets of aligned apertures with a first one of the sets positioned on a first side of a centerline of the base and a second one of the sets positioned on an opposing second side of the centerline of the base.

The various aspects of the various embodiments may be used alone or in any combination, as is desired.

DETAILED DESCRIPTION

Figure 1:
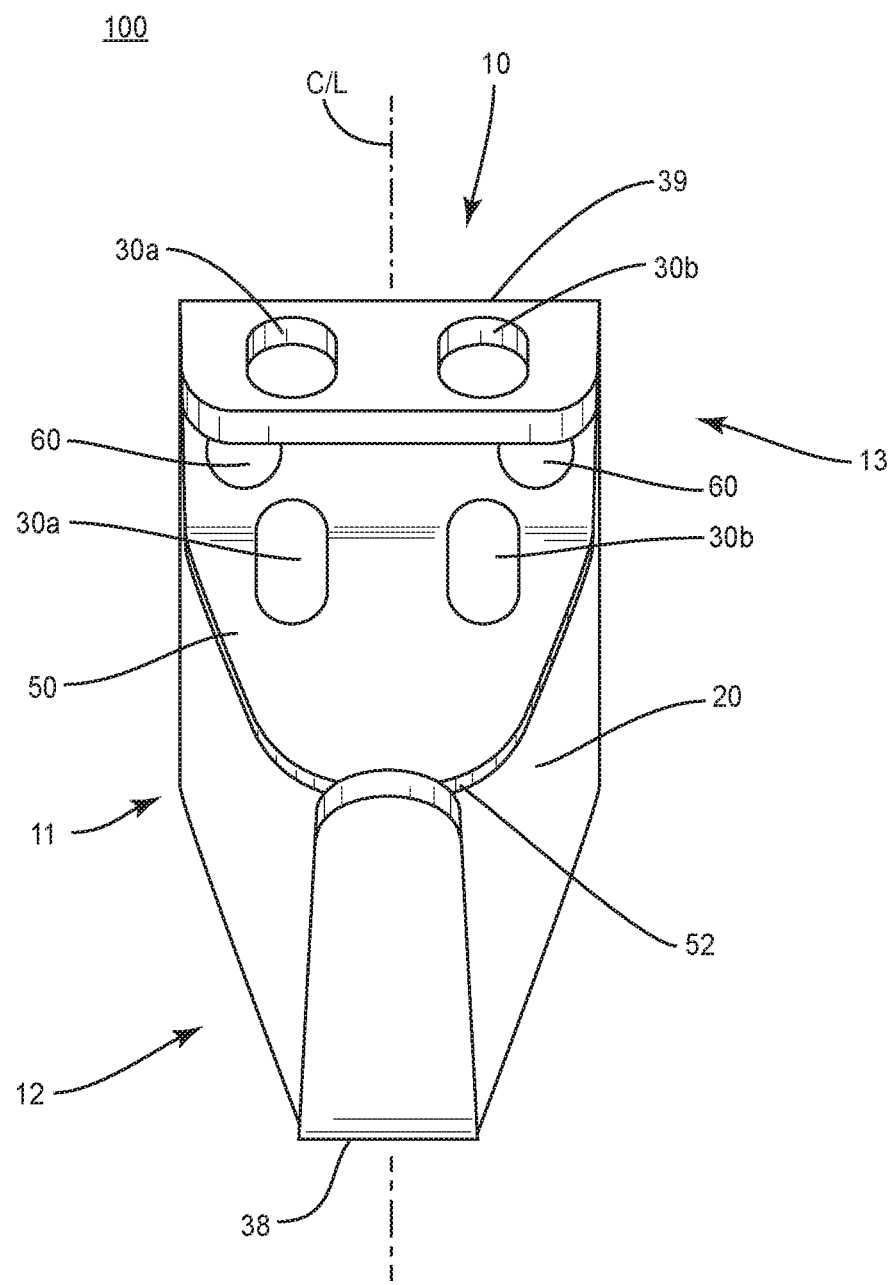
FIG. 1 is a front view of a hanger.
Figure 2:
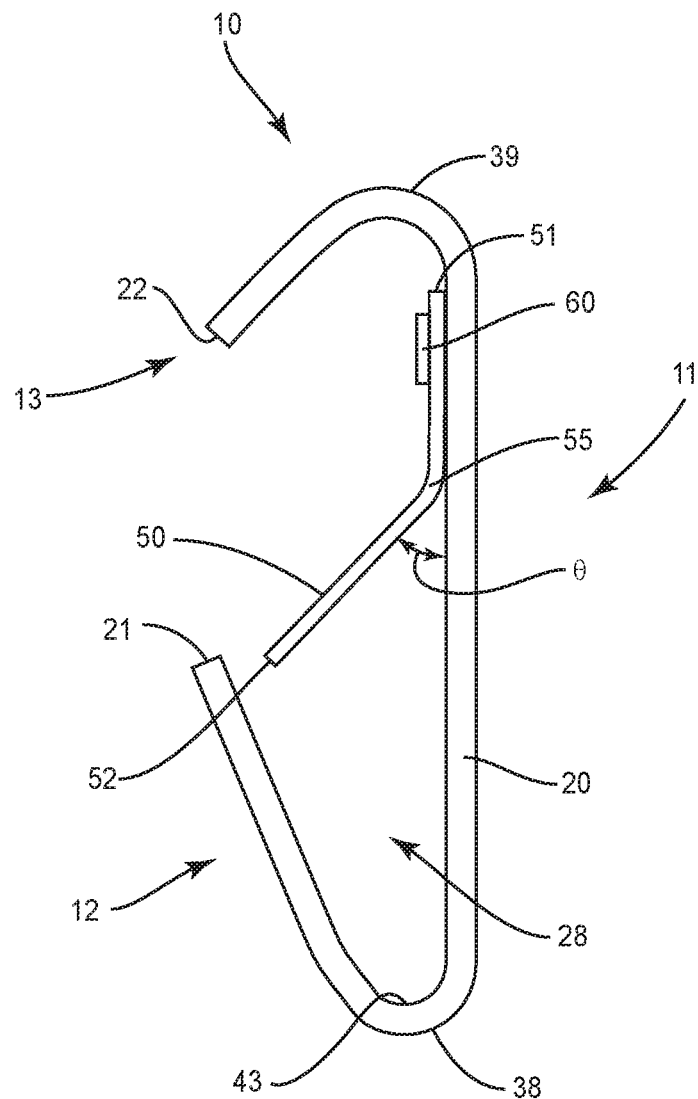
FIG. 2 is a side view of the hanger of FIG. 1.

FIGS. 1 and 2 illustrate a hanger 10 for mounting an object to a vertical support 100, such as a wall. The hanger 10 includes a back 11 with a rear side shaped to contact against the vertical support 100. In one example, the rear side is flat to lie against a flat wall. The rear side can also include other shapes, such as a curved shaped to correspond to a curved support 100. A hook 12 extends outward on a front side of the back 11 and forms a receptacle 28 that receives the object. A mount 13 extends outward from the front side of the back 11. The mount 13 is configured to receive one or more fasteners to secure the hanger 10 to the vertical support 100. A tongue 50 extends outward from the back 11 towards the hook 12. The tongue 50 extends over the receptacle 28. The tongue 50 is flexible to bend down into the receptacle 28 when contacted by the object, and then rebound upward once the object has passed into the receptacle 28.

The hanger 10 includes a base 20 that forms the back 11, a hook 12, and a mount 13. In one example, the base 20 has a unitary, one-piece construction. The base 20 includes a first bend 38 between the back 11 and the hook 12, and a second bend 39 between the back 11 and the mount 13. In another example, the base 20 is constructed from two or more pieces that are attached together.

The base 20 and tongue 50 can be constructed from the same or different materials. Examples of materials include but are not limited to steel, aluminum, and plastic.

Figure 3:
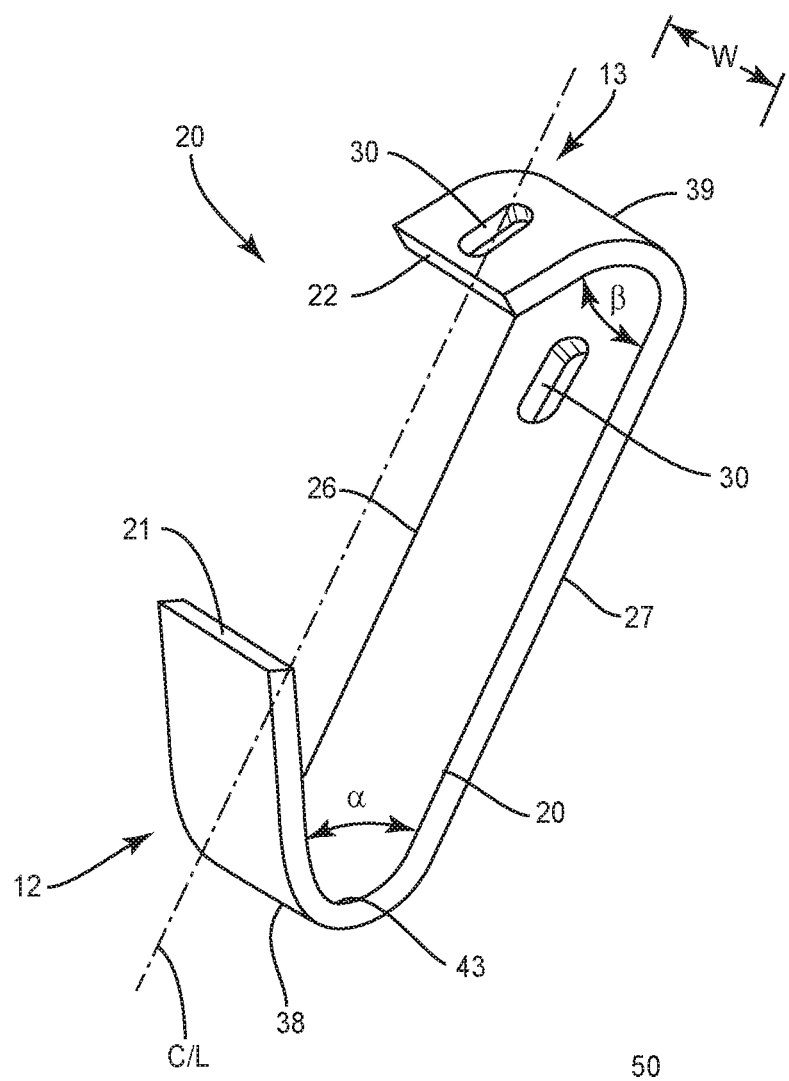
FIG. 3 is a perspective view of a base.

The base 20 includes an elongated shape as illustrated in FIG. 3. The base 20 extends between a first end 21 at the hook 12 and a second end 22 at the mount 13. The base 20 includes a centerline C/L that extends along the back 11, hook 12, and mount 13. The base 20 further includes opposing lateral sides 26, 27 that extend between the first and second ends 21, 22. The base 20 includes a width W measured between the lateral sides 26, 27. In one example, the width W is relatively constant throughout the base 20. In other examples, the width W varies. FIG. 1 includes an example with the hook 12 having a smaller width than a remainder of the base 20.

The hook 12 overlaps with a bottom section of the back 11. The hook 12 is spaced away from the back 11 and forms the receptacle 28 that is sized to receive the elongated member on the object. The first bend 38 is formed at the bottom 43 of the receptacle 28. The bend 38 includes an angle α formed between the hook 12 and back 11. The angle α can vary to accommodate receiving the various objects. The hook 12 and/or back 11 can include straight and/or angular shapes such that the first bend 38 has various shapes (e.g., rounded, angular). The hook 12 includes a length measured between the first bend and the first end 21 and measured along the centerline C/L.

The mount 13 overlaps with a top section of the back 11 and is configured to receive one or more fasteners to secure the hanger 10 to the vertical support 100. The mount 13 is spaced outward and way from the front side of the back 11. The second bend 39 is positioned between the mount 13 and back 12. The second bend 39 forms an angle 11 that can vary. The second bend 39 can have different shapes, including rounded and angular depending upon the shapes of the mount 13 and the back 11. The mount 13 includes a length measured between the second bend 39 and the second end 22. In one example as illustrated in FIGS. 1 and 2, the mount 13 includes a length that is less than the hook 12. In other examples, the mount is longer than the hook 12, and the mount 13 and hook 12 include the same lengths.

The tongue 50 is mounted to the base 20 and extends over the receptacle 28 formed between the hook 12 and back 11. The tongue 50 includes an elongated shape with a first section 53 and a second section 54. In one example, one or both of the first and second sections 53, 54 include a planar shape. In one example as illustrated in FIG. 2, the first section 53 includes a planar shape that matches the shape of the back 11. The tongue 50 further includes a bend 55 that separates the first and second sections 53, 54. The bend positions the first and second sections at an obtuse angle. The tongue 50 is positioned with the first section 53 positioned against the front side of the back 11 and the second section 54 extending outward at an acute angle θ. As illustrated in FIG. 1, the configuration of the tongue 50 provides for the bend 55 to be positioned along the centerline C/L between the first and second ends 21, 22 of the base 20. The second section 54 angles downward with the second end 52 positioned between the mount 13 and back 11. As further illustrated in FIG. 2, the first end 51 is positioned in the overlap between the mount 13 and the back 11.

The tongue 50 is attached to the front side of the back 11. In one example, one or more fasteners 60 extend through the tongue 50 and back 11 to attach the components together. The one or more fasteners 60 can be connected along the first section 53 that abuts against the back 11.

Apertures 30 extend through the mount 13, tongue 50, and back 11. The apertures 30 are aligned in a straight line to receive a fastener, such as a nail or screw, to attach the hanger 10 to the vertical support 100.

In one example as illustrated in FIGS. 1 and 2, the hanger 10 includes multiple sets of apertures 30. Each aperture set includes an aperture 30 in the mount 13, an aperture 30 in the tongue 50, and an aperture 30 in the back 11. Each of the sets is equally spaced laterally away from the centerline C/L. A first set of the apertures 30a is positioned on a first lateral side of the centerline C/L and a second set of the apertures 30b is positioned on an opposing second lateral side. In another example as included in the base 20 and tongue 50 illustrated in FIGS. 3 and 4, the hanger 10 includes a single set of apertures 30 that are aligned on the centerline C/L.

Figure 4:
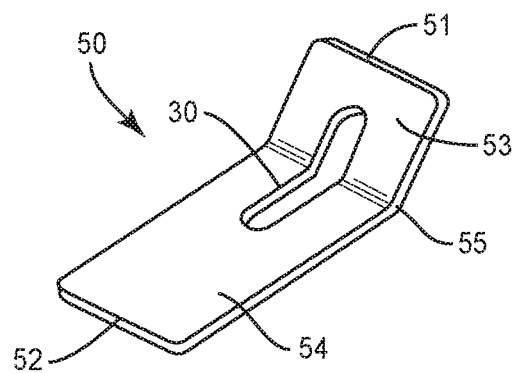
FIG. 4 is a perspective view of a tongue.

In one example as illustrated in FIG. 4, the one or more apertures 30 in the tongue 50 are positioned on the bend 55. The one or more apertures 30 are sized to extend into both of the first and second sections 53, 54.

Figure 5:
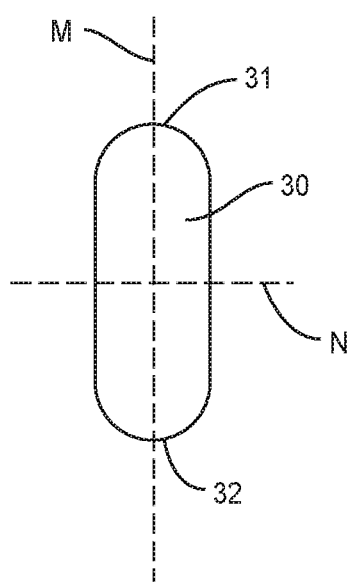
FIG. 5 is a schematic diagram of an aperture with an elongated shape.

In one example as illustrated in FIG. 5, the one or more of the apertures 30 include an elongated shape with a first end 31 and a second end 32. The aperture 30 includes a major axis M that extends through the first and second ends 31, 32. A minor axis N is perpendicular to the major axis M. In one example, the one or more apertures 30 are aligned with the major axis M parallel with the centerline C/L of the base 20 (and the minor axis N perpendicular to the centerline C/L). In one example of a hanger 10 with multiple aperture sets, the apertures in the different sets have major axes M that are parallel.

In one example, each of the apertures 30 in a set includes the same shape and size. In another example, the corresponding apertures 30, 35 include different shapes and/or sizes.

Figure 6:
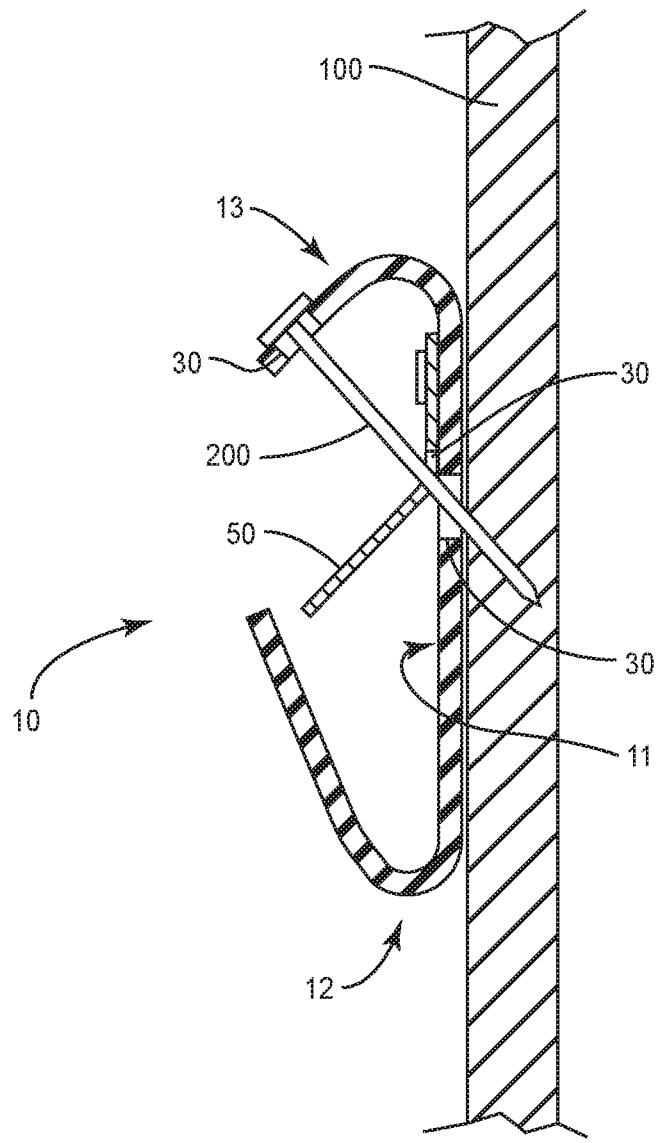
FIG. 6 is a section view of a hanger mounted to a vertical support.

FIG. 6 illustrates a hanger 10 mounted to a vertical support 100. A fastener 200 extends through each of the apertures 30 in the set including through the mount 13, tongue 50, and back 11. The apertures 30 in the set are aligned in a straight line to receive the fastener 200. The rear side of the back 11 contacts against the vertical support 100. The rear side is flat to increase the contract area between the hanger 10 and the vertical support 100.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

The invention claimed is:

1. A hanger to hang an object to a support, the hanger comprising:
   an elongated base comprising a back, a mount that overlaps with a top section of the back, and a hook that overlaps with a bottom section of the back, the elongated base comprising an elongated shape with with the mount comprising a first distal end and the hook comprising a second distal end and the first distal end is spaced apart from the second distal end by a gap;
   a tongue mounted to the back and that extends outward from the back towards the hook, the tongue being exposed at the gap;
   a first aperture that extends through the back, a second aperture that extends through the tongue, and a third aperture that extends through the mount, the first, second, and third apertures being aligned in a straight line;
   wherein the back comprises a flat back surface and the first aperture in the back is aligned with the gap such that the first aperture is positioned lower than the first distal end and higher than the second distal end and such that when a fastener extends through the apertures the fastener is positioned at a non-perpendicular angle relative to the back to secure the hanger to the support; and
   wherein the elongated base comprises a unitary, one-piece construction.

2. The hanger of claim 1, wherein the flat back surface faces away from the mount and the hook.

3. The hanger of claim 1, wherein the first, second, and third apertures each comprise an elongated shape with a major axis that is parallel with a centerline of the elongated base.

4. The hanger of claim 1, wherein the tongue comprises a first section that is mounted to the back and a second section that extends outward from the first section towards the hook.

5. The hanger of claim 4, wherein the second aperture in the tongue is positioned at an intersection of the first and second sections of the tongue.

6. The hanger of claim 1, further comprising tongue fasteners that connect the tongue to the back.

7. The hanger of claim 1, wherein the hook comprises a greater length than the mount with the length measured along a centerline of the elongated base.

8. The hanger of claim 1, wherein the tongue comprises an upper edge and a lower edge, the upper edge is positioned in the overlap between the mount and the back and the lower edge is positioned in the overlap between the hook and the back.

9. A hanger to hang an object to a support, the hanger comprising:
   a base comprising:
   a back with a front surface and a back surface, the back surface is flat to contact against the support;
   a hook that extends from the back and is positioned in front of the front surface at a lower section of the back;
   a mount that extends from the back and is positioned in front of the front surface of an upper section of the back;
   wherein the mount comprises a first distal end and the hook comprises a second distal end and the first distal end is spaced apart from the second distal end by a gap;
   a tongue mounted to the front surface of the back and that extends outward from the front surface towards the hook, the tongue comprising an elongated shape that extends outward from the back and is flexible to bend when contacted by the object; and
   a first aperture that extends through the back, a second aperture that extends through the tongue, and a third aperture that extends through the mount, with the first aperture in the back aligned with the gap such that the first aperture is positioned lower than the first distal end and higher than the second distal end and with the first, second, and third apertures aligned in a straight line to position a fastener at a non-perpendicular angle relative to the back surface of the back when the fastener extends through the apertures to secure the hanger to the support.

10. The hanger of claim 9, wherein the tongue comprises an upper edge and a lower edge, the upper edge is positioned in a first overlap between the mount and the back and the lower edge is positioned in a second overlap between the hook and the back.

11. The hanger of claim 9, wherein the tongue overlaps with both the hook and the mount.

12. The hanger of claim 9, wherein the tongue comprises an angular shape with a first planar section mounted to the front surface of the back and a second planar section that extends outward from the front surface towards the hook.

13. The hanger of claim 12, wherein the second aperture in the tongue is positioned at an intersection of the first and second sections.

14. The hanger of claim 9, wherein the first, second, and third apertures each comprise an elongated shape that is parallel with a centerline of the base.

15. A hanger to hang an object to a support, the hanger comprising:
   a base comprising:
   a back configured to contact against the support, the back being flat;
   a hook that overlaps with a bottom section of the back;
   a mount that overlaps with a top section of the back;

wherein the mount comprises a first distal end and the hook comprises a second distal end and the first distal end is spaced apart from the second distal end by a gap;

a tongue comprising an elongated shape and is spaced away from each of the hook and the mount, the tongue comprising:

a first section mounted to the back: a second section that extends outward towards the hook;

a bend positioned at the intersection of the first and second sections, the bend configured for the first and second sections to be aligned at an obtuse angle; and the tongue extends outward from the back and is flexible to bend when contacted by the object;

a first aperture that extends through the back, a second aperture that extends through the tongue, and a third aperture that extends through the mount, with the first aperture in the back aligned with the gap such that the first aperture is positioned lower than the first distal end and higher than the second distal end and with the first, second, and third apertures aligned in a straight line to position a fastener at a non-perpendicular angle relative to the back when the fastener is inserted to secure the hanger to the support, and with the second aperture in the tongue positioned at the bend and extending into each of the first and second sections;

each of the tongue and the base constructed from a strip of material with the strip having a thickness measured between front and back surfaces with the thickness of the tongue being smaller than the thickness of the base.

16. The hanger of claim 15, wherein the back comprises a flat back surface that faces away from the hook and the mount.

* * * * *